(12) United States Patent
Sun et al.

(10) Patent No.: US 12,217,157 B2
(45) Date of Patent: Feb. 4, 2025

(54) SYSTEM, METHOD, AND COMPUTER PROGRAM PRODUCT FOR DYNAMIC NODE CLASSIFICATION IN TEMPORAL-BASED MACHINE LEARNING CLASSIFICATION MODELS

(71) Applicant: Visa International Service Association, San Francisco, CA (US)

(72) Inventors: Jiarui Sun, Urbana, IL (US); Mengting Gu, Stanford, CA (US); Michael Yeh, Newark, CA (US); Liang Wang, San Jose, CA (US); Wei Zhang, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/271,301

(22) PCT Filed: Jan. 30, 2023

(86) PCT No.: PCT/US2023/011830
§ 371 (c)(1),
(2) Date: Jul. 7, 2023

(87) PCT Pub. No.: WO2023/147106
PCT Pub. Date: Aug. 3, 2023

(65) Prior Publication Data
US 2024/0078416 A1   Mar. 7, 2024

Related U.S. Application Data

(60) Provisional application No. 63/304,771, filed on Jan. 31, 2022.

(51) Int. Cl.
*G06N 3/04*   (2023.01)
*G06F 17/16*  (2006.01)
*G06N 3/049*  (2023.01)

(52) U.S. Cl.
CPC ............ *G06N 3/049* (2013.01); *G06F 17/16* (2013.01)

(58) Field of Classification Search
CPC ................................ G06N 3/049; G06F 17/16
See application file for complete search history.

(56) References Cited

U.S. PATENT DOCUMENTS 11,461,581 B2 * 10/2022 Luo .................... G06N 3/084
11,822,533 B2 * 11/2023 Flöther ................ G06F 16/23
(Continued)

OTHER PUBLICATIONS

Bianchi et al., "Graph Neural Networks with Convolutional ARMA Filters", Jan. 24, 2021, 14 pages.
(Continued)

*Primary Examiner* — Omar F Fernandez Rivas
*Assistant Examiner* — Tri T Nguyen
(74) *Attorney, Agent, or Firm* — The Webb Law Firm

(57) ABSTRACT

Described are a system, method, and computer program product for dynamic node classification in temporal-based machine learning classification models. The method includes receiving graph data of a discrete time dynamic graph including graph snapshots, and node classifications associated with all nodes in the discrete time dynamic graph. The method includes converting the discrete time dynamic graph to a time-augmented spatio-temporal graph and generating an adjacency matrix based on a temporal walk of the time-augmented spatio-temporal graph. The method includes generating an adaptive information transition matrix based on the adjacency matrix and determining feature vectors based on the nodes and the node attribute matrix of each graph snapshot. The method includes generating and propagating initial node representations across information propagation layers using the adaptive information transition matrix and classifying a node of the discrete time (Continued)

time dynamic graph subsequent to the first time period based on final node representations.

20 Claims, 7 Drawing Sheets

(56) References Cited

U.S. PATENT DOCUMENTS

| | | | | |
|---|---|---|---|---|
| 2002/0126648 | A1* | 9/2002 | Kuchi | H04L 1/0618 370/347 |
| 2018/0062937 | A1 | 3/2018 | Narasimhan et al. | |
| 2020/0265291 | A1* | 8/2020 | Cheng | G06N 3/044 |
| 2020/0366690 | A1 | 11/2020 | Cheng et al. | |
| 2020/0387135 | A1* | 12/2020 | Khorasgani | G05B 19/406 |
| 2021/0067558 | A1* | 3/2021 | Ni | H04L 41/14 |
| 2021/0326389 | A1 | 10/2021 | Sankar et al. | |
| 2022/0101103 | A1* | 3/2022 | Fatemi | G06N 3/088 |
| 2022/0150123 | A1* | 5/2022 | Kim | G06F 16/9024 |

OTHER PUBLICATIONS

Brody et al., "How Attentive Are Graph Attention Networks?", Oct. 11, 2021, 24 pages.
Chen et al., "Simple and Deep Graph Convolutional Networks", Proceedings of the 37th International Conference on Machine Learning, 2020, 11 pages.
Chien et al., "Adaptive Universal Generalized PageRank Graph Neural Network", International Conference on Learning Representations, 2021, 24 pages.
Gasteiger et al., "Predict Then Propagate: Graph Neural Networks Meet Personalized PageRank", International Conference on Learning Representations, 2019, 15 pages.
Gehring et al., "Convolutional Sequence to Sequence Learning", Proceedings of the 34th International Conference on Machine Learning, 2017, 10 pages, Sydney, Australia.
Goyal et al., "DynGEM: Deep Embedding Method for Dynamic Graphs", May 29, 2018, 8 pages.
Grover et al., "node2vec: Scalable Feature Learning for Networks", International Conference on Knowledge Discovery and Data Mining, Aug. 13, 2016, 10 pages, San Francisco, CA.
Hamilton et al., "Inductive Representation Learning on Large Graphs", 31st Conference on Neural Information Processing Systems, 2017, 11 pages, Long Beach, CA.
Kingma et al., "Adam: A Method for Stochastic Optimization", International Conference on Learning Representations, 2015, 15 pages.
Kipf et al., "Semi-Supervised Classification With Graph Convolutional Networks", International Conference on Learning Representations, 2017, 14 pages.
Kumar et al., "Predicting Dynamic Embedding Trajectory in Temporal Interaction Networks", International Conference on Knowledge Discovery and Data Mining, Aug. 4, 2019, 11 pages, Anchorage, AK.
Levie et al., "CayleyNets: Graph Convolutional Neural Networks with Complex Rational Spectral Filters", Oct. 31, 2018, 20 pages.
Li et al., "Deeper Insights into Graph Convolutional Networks for Semi-Supervised Learning", The Thirty-Second AAAI Conference on Artificial Intelligence, 2018, pp. 3538-3545.
Manessi et al., "Dynamic graph convolutional networks", Pattern Recognition, 2020, 18 pages, vol. 97.
Nguyen et al., "Continuous-Time Dynamic Network Embeddings", Track; Third International Workshop on Learning Representation for Big Networks, Apr. 23, 2018, pp. 969-976, Lyon, France.
Pareja et al., "EvolveGCN: Evolving Graph Convolutional Networks for Dynamic Graphs", The Thirty-Fourth AAAI Conference on Artificial Intelligence, 2020, pp. 5363-5370.
Paszke et al., "PyTorch: An Imperative Style, High-Performance Deep Learning Library", 33rd Conference on Neural Information Processing Systems, 2019, 12 pages, Vancouver, Canada.
Perozzi et al., "DeepWalk: Online Learning of Social Representations", International Conference on Knowledge Discovery and Data Mining, Aug. 24, 2014, pp. 701-710, New York, NY.
Rossi et al., "Temporal Graph Networks for Deep Learning on Dynamic Graphs", Proceedings of the 37th International Conference on Machine Learning, 2020, 9 pages, Vienna, Austria.
Rozenshtein et al., "Temporal PageRank", European Conference on Machine Learning and Principles and Practice of Knowledge Discovery in Databases, 2016, pp. 674-689.
Sankar et al., "DySAT: Deep Neural Representation Learning on Dynamic Graphs via Self-Attention Networks", International Conference on Web Search and Data Mining, Feb. 3, 2020, 9 pages, Houston, TX.
Page et al., "The PageRank Citation Ranking: Bringing Order to the Web", Jan. 29, 1998, 17 pages.
Trivedi et al., "DyREP: Learning Representations Over Dynamic Graphs", International Conference on Learning Representations, 2019, 25 pages.
Vaswani et al., "Attention Is All You Need", 31st Conference on Neural Information Processing Systems, 2017, 11 pages, Long Beach, CA.
Velickovic et al., "Graph Attention Networks", International Conference on Learning Representations, 2018, 12 pages.
Xu et al., "How Powerful Are Graph Neural Networks?", International Conference on Learning Representations, 2019, 17 pages.
Xu et al., "Spatio-Temporal Attentive RNN for Node Classification in Temporal Attributed Graphs", Proceedings of the Twenty-Eighth International Joint Conference on Artificial Intelligence, 2019, pp. 3947-3953.
Xu et al., "Inductive Representation Learning On Temporal Graphs", International Conference on Learning Representations, 2020, 19 pages.

* cited by examiner

SYSTEM, METHOD, AND COMPUTER PROGRAM PRODUCT FOR DYNAMIC NODE CLASSIFICATION IN TEMPORAL-BASED MACHINE LEARNING CLASSIFICATION MODELS

CROSS REFERENCE TO RELATED APPLICATIONS

This application is the United States national phase of International Application No. PCT/US2023/011830 filed Jan. 30, 2023, and claims priority to U.S. Provisional Patent Application No. 63/304,771, filed Jan. 31, 2022, the disclosures of which are hereby incorporated by reference in their entirety

BACKGROUND

1. Technical Field

This disclosure relates generally to temporal-based classification models and, in non-limiting embodiments or aspects, to systems, methods, and computer program products for improved dynamic node classification in temporal-based machine learning classification models.

2. Technical Considerations

Various classification models (e.g., PageRank) may be used to classify nodes in a dynamic graph. For entity classification of nodes in dynamic graphs, there is a need to capture the graph structure information, as well as the entity history information. To capture long histories and long-distance entity interactions, deep graph neural networks often encounter the issue of over-smoothing, where node embeddings become less distinguishable for each successive time period. Over-smoothing leads to reduced model performance (e.g., prediction accuracy). Moreover, many neural network designs may not be suitable for heterophilic graphs. For the use case of fraud detection and mitigation systems, over-smoothing in such classification models may lead to reduced model performance, which increases computational cost related to misclassification, including false negatives, wherein entities associated with fraud may continue to generate system communications while misclassified.

There is a need in the art for improved dynamic node classification in temporal-based machine learning classification models.

SUMMARY

According to some non-limiting embodiments or aspects, provided is a system, method, and computer program product for dynamic node classification in temporal-based machine learning classification models.

According to some non-limiting embodiments or aspects, provided is a computer-implemented method for dynamic node classification in temporal-based machine learning classification models. The method includes receiving, with at least one processor, graph data of a discrete time dynamic graph including a plurality of graph snapshots, wherein each graph snapshot of the plurality of graph snapshots is associated with an instance of the discrete time dynamic graph at a time step in a first time period, and wherein each graph snapshot of the plurality of graph snapshots includes a plurality of nodes, a plurality of edges, and a node attribute matrix. The method also includes receiving, with at least one processor, a plurality of node classifications associated with all nodes in the discrete time dynamic graph, wherein each node classification of the plurality of node classifications is associated with a node of the plurality of nodes in each graph snapshot of the plurality of graph snapshots. The method further includes converting, with at least one processor, the discrete time dynamic graph to a time-augmented spatio-temporal graph based on the plurality of edges of each graph snapshot of the plurality of graph snapshots. The method further includes generating, with at least one processor, at least one adjacency matrix based on a temporal walk of the time-augmented spatio-temporal graph. The method further includes generating, with at least one processor, at least one adaptive information transition matrix based on the at least one adjacency matrix. The method further includes determining, with at least one processor, a plurality of feature vectors based on the plurality of nodes and the node attribute matrix of each graph snapshot of the plurality of graph snapshots, wherein each feature vector of the plurality of feature vectors is associated with a node of the discrete time dynamic graph. The method further includes generating, with at least one processor, a plurality of initial node representations, wherein each initial node representation of the plurality of initial node representations is based on a feature vector of the plurality of feature vectors and a node associated with the feature vector. The method further includes propagating, with at least one processor, the plurality of initial node representations across a plurality of information propagation layers using the at least one adaptive information transition matrix, to produce a plurality of final node representations based on an output of a final layer of the plurality of information propagation layers. The method further includes classifying, with at least one processor, at least one node of the discrete time dynamic graph in a time step of a second time period subsequent to the first time period based on the plurality of final node representations.

In some non-limiting embodiments or aspects, generating the adjacency matrix based on the temporal walk of the time-augmented spatio-temporal graph may include generating, with at least one processor, the adjacency matrix based on a bijection between all possible temporal walks of the time-augmented spatio-temporal graph and all possible temporal walks of the discrete time dynamic graph.

In some non-limiting embodiments or aspects, generating the adjacency matrix based on the temporal walk of the time-augmented spatio-temporal graph may include restricting, with at least one processor, the temporal walk such that when traversing from a first node in a first time step to a second node in a second time step, the temporal walk must first visit a same node in the second time step that corresponds to the first node in the first time step.

In some non-limiting embodiments or aspects, the at least one adjacency matrix may include a structural adjacency matrix and a temporal adjacency matrix. The at least one adaptive information transition matrix may include an adaptive structural transition matrix and an adaptive temporal transition matrix.

In some non-limiting embodiments or aspects, classifying the at least one node of the discrete time dynamic graph may include converting, with at least one processor, the plurality of final node representations to a plurality of class logits using a multilayer perceptron decoder, and classifying, with at least one processor, the at least one node based on the plurality of class logits.

In some non-limiting embodiments or aspects, generating the at least one adaptive information transition matrix based on the at least one adjacency matrix may include generating, with at least one processor, the at least one adaptive information transition matrix based on the at least one adjacency matrix using a dynamic attention mechanism, and determining, with at least one processor, an attention weight for the dynamic attention mechanism using a nonlinear activation function.

In some non-limiting embodiments or aspects, propagating the plurality of initial node representations across the plurality of information propagation layers using the at least one adaptive information transition matrix may include feeding, with at least one processor, a plurality of intermediate node representations produced from a first information propagation layer of the plurality of information propagation layers as an input into a second information propagation layer of the plurality of information propagation layers.

According to some non-limiting embodiments or aspects, provided is a system for dynamic node classification in temporal-based machine learning classification models. The system includes at least one processor. The at least one processor is programmed or configured to receive graph data of a discrete time dynamic graph including a plurality of graph snapshots, wherein each graph snapshot of the plurality of graph snapshots is associated with an instance of the discrete time dynamic graph at a time step in a first time period, and wherein each graph snapshot of the plurality of graph snapshots includes a plurality of nodes, a plurality of edges, and a node attribute matrix. The at least one processor is also programmed or configured to receive a plurality of node classifications associated with all nodes in the discrete time dynamic graph, wherein each node classification of the plurality of node classifications is associated with a node of the plurality of nodes in each graph snapshot of the plurality of graph snapshots. The at least one processor is further programmed or configured to convert the discrete time dynamic graph to a time-augmented spatio-temporal graph based on the plurality of edges of each graph snapshot of the plurality of graph snapshots. The at least one processor is further programmed or configured to generate at least one adjacency matrix based on a temporal walk of the time-augmented spatio-temporal graph. The at least one processor is further programmed or configured to generate at least one adaptive information transition matrix based on the at least one adjacency matrix. The at least one processor is further programmed or configured to determine a plurality of feature vectors based on the plurality of nodes and the node attribute matrix of each graph snapshot of the plurality of graph snapshots, wherein each feature vector of the plurality of feature vectors is associated with a node of the discrete time dynamic graph. The at least one processor is further programmed or configured to generate a plurality of initial node representations, wherein each initial node representation of the plurality of initial node representations is based on a feature vector of the plurality of feature vectors and a node associated with the feature vector. The at least one processor is further programmed or configured to propagate the plurality of initial node representations across a plurality of information propagation layers using the at least one adaptive information transition matrix to produce a plurality of final node representations based on an output of a final layer of the plurality of information propagation layers. The at least one processor is further programmed or configured to classify at least one node of the discrete time dynamic graph in a time step of a second time period subsequent to the first time period based on the plurality of final node representations.

In some non-limiting embodiments or aspects, while generating the adjacency matrix based on the temporal walk of the time-augmented spatio-temporal graph, the at least one processor may be programmed or configured to generate the adjacency matrix based on a bijection between all possible temporal walks of the time-augmented spatio-temporal graph and all possible temporal walks of the discrete time dynamic graph.

In some non-limiting embodiments or aspects, while generating the adjacency matrix based on the temporal walk of the time-augmented spatio-temporal graph, the at least one processor may be programmed or configured to restrict the temporal walk such that when traversing from a first node in a first time step to a second node in a second time step, the temporal walk must first visit a same node in the second time step that corresponds to the first node in the first time step.

In some non-limiting embodiments or aspects, the at least one adjacency matrix may include a structural adjacency matrix and a temporal adjacency matrix. The at least one adaptive information transition matrix may include an adaptive structural transition matrix and an adaptive temporal transition matrix.

In some non-limiting embodiments or aspects, while classifying the at least one node of the discrete time dynamic graph, the at least one processor may be programmed or configured to convert the plurality of final node representations to a plurality of class logits using a multilayer perceptron decoder, and classify the at least one node based on the plurality of class logits.

According to some non-limiting embodiments or aspects, provided is a computer program product for dynamic node classification in temporal-based machine learning classification models. The computer program product includes at least one non-transitory computer-readable medium including one or more instructions. The one or more instructions, when executed by at least one processor, cause the at least one processor to receive graph data of a discrete time dynamic graph including a plurality of graph snapshots, wherein each graph snapshot of the plurality of graph snapshots is associated with an instance of the discrete time dynamic graph at a time step in a first time period, and wherein each graph snapshot of the plurality of graph snapshots includes a plurality of nodes, a plurality of edges, and a node attribute matrix. The one or more instructions also cause the at least one processor to receive a plurality of node classifications associated with all nodes in the discrete time dynamic graph, wherein each node classification of the plurality of node classifications is associated with a node of the plurality of nodes in each graph snapshot of the plurality of graph snapshots. The one or more instructions further cause the at least one processor to convert the discrete time dynamic graph to a time-augmented spatio-temporal graph based on the plurality of edges of each graph snapshot of the plurality of graph snapshots. The one or more instructions further cause the at least one processor to generate at least one adjacency matrix based on a temporal walk of the time-augmented spatio-temporal graph. The one or more instructions further cause the at least one processor to generate at least one adaptive information transition matrix based on the at least one adjacency matrix. The one or more instructions further cause the at least one processor to determine a plurality of feature vectors based on the plurality of nodes and the node attribute matrix of each graph snapshot of the plurality of graph snapshots, wherein each feature vector of the plurality of feature vectors is associated with a node of the discrete time dynamic graph. The one or more instructions further cause the at least one processor to generate a plurality of initial node representations, wherein each initial node representation of the plurality of initial node representations is based on a feature vector of the plurality of feature vectors and a node associated with the feature vector. The one or more instructions further cause the at least one processor to propagate the plurality of initial node representations across a plurality of information propagation layers using the at least one adaptive information transition matrix, to produce a plurality of final node representations based on an output of a final layer of the plurality of information propagation layers. The one or more instructions further cause the at least one processor to classify at least one node of the discrete time dynamic graph in a time step of a second time period subsequent to the first time period based on the plurality of final node representations.

In some non-limiting embodiments or aspects, the one or more instructions that cause the at least one processor to generate the adjacency matrix based on the temporal walk of the time-augmented spatio-temporal graph may cause the at least one processor to generate the adjacency matrix based on a bijection between all possible temporal walks of the time-augmented spatio-temporal graph and all possible temporal walks of the discrete time dynamic graph.

In some non-limiting embodiments or aspects, the one or more instructions that cause the at least one processor to generate the adjacency matrix based on the temporal walk of the time-augmented spatio-temporal graph may cause the at least one processor to restrict the temporal walk such that when traversing from a first node in a first time step to a second node in a second time step, the temporal walk must first visit a same node in the second time step that corresponds to the first node in the first time step.

In some non-limiting embodiments or aspects, the at least one adjacency matrix may include a structural adjacency matrix and a temporal adjacency matrix. The at least one adaptive information transition matrix may include an adaptive structural transition matrix and an adaptive temporal transition matrix.

In some non-limiting embodiments or aspects, the one or more instructions that cause the at least one processor to classify the at least one node of the discrete time dynamic graph may cause the at least one processor to convert the plurality of final node representations to a plurality of class logits using a multilayer perceptron decoder, and classify the at least one node based on the plurality of class logits.

Other non-limiting embodiments or aspects will be set forth in the following numbered clauses:

Clause 1: A computer-implemented method comprising: receiving, with at least one processor, graph data of a discrete time dynamic graph comprising a plurality of graph snapshots, wherein each graph snapshot of the plurality of graph snapshots is associated with an instance of the discrete time dynamic graph at a time step in a first time period, and wherein each graph snapshot of the plurality of graph snapshots comprises a plurality of nodes, a plurality of edges, and a node attribute matrix; receiving, with at least one processor, a plurality of node classifications associated with all nodes in the discrete time dynamic graph, wherein each node classification of the plurality of node classifications is associated with a node of the plurality of nodes in each graph snapshot of the plurality of graph snapshots; converting, with at least one processor, the discrete time dynamic graph to a time-augmented spatio-temporal graph based on the plurality of edges of each graph snapshot of the plurality of graph snapshots; generating, with at least one processor, at least one adjacency matrix based on a temporal walk of the time-augmented spatio-temporal graph; generating, with at least one processor, at least one adaptive information transition matrix based on the at least one adjacency matrix; determining, with at least one processor, a plurality of feature vectors based on the plurality of nodes and the node attribute matrix of each graph snapshot of the plurality of graph snapshots, wherein each feature vector of the plurality of feature vectors is associated with a node of the discrete time dynamic graph; generating, with at least one processor, a plurality of initial node representations, wherein each initial node representation of the plurality of initial node representations is based on a feature vector of the plurality of feature vectors and a node associated with the feature vector; propagating, with at least one processor, the plurality of initial node representations across a plurality of information propagation layers using the at least one adaptive information transition matrix, to produce a plurality of final node representations based on an output of a final layer of the plurality of information propagation layers; and classifying, with at least one processor, at least one node of the discrete time dynamic graph in a time step of a second time period subsequent to the first time period based on the plurality of final node representations.

Clause 2: The method of clause 1, wherein generating the adjacency matrix based on the temporal walk of the time-augmented spatio-temporal graph comprises: generating, with at least one processor, the adjacency matrix based on a bijection between all possible temporal walks of the time-augmented spatio-temporal graph and all possible temporal walks of the discrete time dynamic graph.

Clause 3: The method of clause 1 or clause 2, wherein generating the adjacency matrix based on the temporal walk of the time-augmented spatio-temporal graph comprises: restricting, with at least one processor, the temporal walk such that when traversing from a first node in a first time step to a second node in a second time step, the temporal walk must first visit a same node in the second time step that corresponds to the first node in the first time step.

Clause 4: The method of any of clauses 1-3, wherein the at least one adjacency matrix comprises a structural adjacency matrix and a temporal adjacency matrix.

Clause 5: The method of any of clauses 1-4, wherein the at least one adaptive information transition matrix comprises an adaptive structural transition matrix and an adaptive temporal transition matrix.

Clause 6: The method of any of clauses 1-5, wherein classifying the at least one node of the discrete time dynamic graph comprises: converting, with at least one processor, the plurality of final node representations to a plurality of class logits using a multilayer perceptron decoder; and classifying, with at least one processor, the at least one node based on the plurality of class logits.

Clause 7: The method of any of clauses 1-6, wherein generating the at least one adaptive information transition matrix based on the at least one adjacency matrix comprises: generating, with at least one processor, the at least one adaptive information transition matrix based on the at least one adjacency matrix using a dynamic attention mechanism; and determining, with at least one processor, an attention weight for the dynamic attention mechanism using a non-linear activation function.

Clause 8: The method of any of clauses 1-7, wherein propagating the plurality of initial node representations across the plurality of information propagation layers using the at least one adaptive information transition matrix comprises: feeding, with at least one processor, a plurality of intermediate node representations produced from a first information propagation layer of the plurality of information propagation layers as an input into a second information propagation layer of the plurality of information propagation layers.

Clause 9: A system comprising at least one processor, the at least one processor being programmed or configured to: receive graph data of a discrete time dynamic graph comprising a plurality of graph snapshots, wherein each graph snapshot of the plurality of graph snapshots is associated with an instance of the discrete time dynamic graph at a time step in a first time period, and wherein each graph snapshot of the plurality of graph snapshots comprises a plurality of nodes, a plurality of edges, and a node attribute matrix; receive a plurality of node classifications associated with all nodes in the discrete time dynamic graph, wherein each node classification of the plurality of node classifications is associated with a node of the plurality of nodes in each graph snapshot of the plurality of graph snapshots; convert the discrete time dynamic graph to a time-augmented spatio-temporal graph based on the plurality of edges of each graph snapshot of the plurality of graph snapshots; generate at least one adjacency matrix based on a temporal walk of the time-augmented spatio-temporal graph; generate at least one adaptive information transition matrix based on the at least one adjacency matrix; determine a plurality of feature vectors based on the plurality of nodes and the node attribute matrix of each graph snapshot of the plurality of graph snapshots, wherein each feature vector of the plurality of feature vectors is associated with a node of the discrete time dynamic graph; generate a plurality of initial node representations, wherein each initial node representation of the plurality of initial node representations is based on a feature vector of the plurality of feature vectors and a node associated with the feature vector; propagate the plurality of initial node representations across a plurality of information propagation layers using the at least one adaptive information transition matrix, to produce a plurality of final node representations based on an output of a final layer of the plurality of information propagation layers; and classify at least one node of the discrete time dynamic graph in a time step of a second time period subsequent to the first time period based on the plurality of final node representations.

Clause 10: The system of clause 9, wherein, while generating the adjacency matrix based on the temporal walk of the time-augmented spatio-temporal graph, the at least one processor is programmed or configured to: generate the adjacency matrix based on a bijection between all possible temporal walks of the time-augmented spatio-temporal graph and all possible temporal walks of the discrete time dynamic graph.

Clause 11: The system of clause 9 or clause 10, wherein, while generating the adjacency matrix based on the temporal walk of the time-augmented spatio-temporal graph, the at least one processor is programmed or configured to: restrict the temporal walk such that when traversing from a first node in a first time step to a second node in a second time step, the temporal walk must first visit a same node in the second time step that corresponds to the first node in the first time step.

Clause 12: The system of any of clauses 9-11, wherein the at least one adjacency matrix comprises a structural adjacency matrix and a temporal adjacency matrix.

Clause 13: The system of any of clauses 9-12, wherein the at least one adaptive information transition matrix comprises an adaptive structural transition matrix and an adaptive temporal transition matrix.

Clause 14: The system of any of clauses 9-13, wherein, while classifying the at least one node of the discrete time dynamic graph, the at least one processor is programmed or configured to: convert the plurality of final node representations to a plurality of class logits using a multilayer perceptron decoder; and classify the at least one node based on the plurality of class logits.

Clause 15: A computer program product comprising at least one non-transitory computer-readable medium comprising one or more instructions that, when executed by at least one processor, cause the at least one processor to: receive graph data of a discrete time dynamic graph comprising a plurality of graph snapshots, wherein each graph snapshot of the plurality of graph snapshots is associated with an instance of the discrete time dynamic graph at a time step in a first time period, and wherein each graph snapshot of the plurality of graph snapshots comprises a plurality of nodes, a plurality of edges, and a node attribute matrix; receive a plurality of node classifications associated with all nodes in the discrete time dynamic graph, wherein each node classification of the plurality of node classifications is associated with a node of the plurality of nodes in each graph snapshot of the plurality of graph snapshots; convert the discrete time dynamic graph to a time-augmented spatio-temporal graph based on the plurality of edges of each graph snapshot of the plurality of graph snapshots; generate at least one adjacency matrix based on a temporal walk of the time-augmented spatio-temporal graph; generate at least one adaptive information transition matrix based on the at least one adjacency matrix; determine a plurality of feature vectors based on the plurality of nodes and the node attribute matrix of each graph snapshot of the plurality of graph snapshots, wherein each feature vector of the plurality of feature vectors is associated with a node of the discrete time dynamic graph; generate a plurality of initial node representations, wherein each initial node representation of the plurality of initial node representations is based on a feature vector of the plurality of feature vectors and a node associated with the feature vector; propagate the plurality of initial node representations across a plurality of information propagation layers using the at least one adaptive information transition matrix, to produce a plurality of final node representations based on an output of a final layer of the plurality of information propagation layers; and classify at least one node of the discrete time dynamic graph in a time step of a second time period subsequent to the first time period based on the plurality of final node representations.

Clause 16: The computer program product of clause 15, wherein the one or more instructions that cause the at least one processor to generate the adjacency matrix based on the temporal walk of the time-augmented spatio-temporal graph cause the at least one processor to: generate the adjacency matrix based on a bijection between all possible temporal walks of the time-augmented spatio-temporal graph and all possible temporal walks of the discrete time dynamic graph.

Clause 17: The computer program product of clause 15 or clause 16, wherein the one or more instructions that cause the at least one processor to generate the adjacency matrix based on the temporal walk of the time-augmented spatio-temporal graph cause the at least one processor to: restrict the temporal walk such that when traversing from a first node in a first time step to a second node in a second time step, the temporal walk must first visit a same node in the second time step that corresponds to the first node in the first time step.

Clause 18: The computer program product of any of clauses 15-17, wherein the at least one adjacency matrix comprises a structural adjacency matrix and a temporal adjacency matrix.

Clause 19: The computer program product of any of clauses 15-18, wherein the at least one adaptive information transition matrix comprises an adaptive structural transition matrix and an adaptive temporal transition matrix.

Clause 20: The computer program product of any of clauses 15-19, wherein the one or more instructions that cause the at least one processor to classify the at least one node of the discrete time dynamic graph cause the at least one processor to: convert the plurality of final node representations to a plurality of class logits using a multilayer perceptron decoder; and classify the at least one node based on the plurality of class logits.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments or aspects that are illustrated in the accompanying schematic figures, in which.

Figure 1:
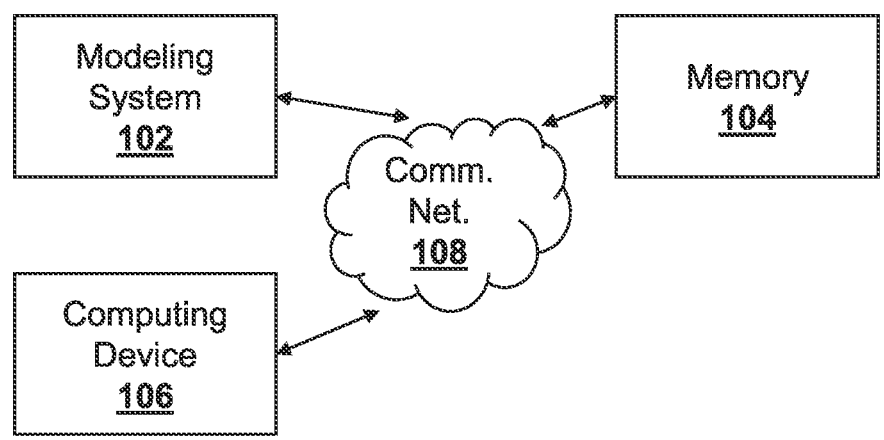
FIG. 1 is a schematic diagram of a system for dynamic node classification in temporal-based machine learning classification models, according to non-limiting embodiments or aspects.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

For purposes of the description hereinafter, the terms "upper", "lower", "right", "left", "vertical", "horizontal", "top", "bottom", "lateral", "longitudinal," and derivatives thereof shall relate to non-limiting embodiments or aspects as they are oriented in the drawing figures. However, it is to be understood that non-limiting embodiments or aspects may assume various alternative variations and step sequences, except where expressly specified to the contrary. It is also to be understood that the specific devices and processes illustrated in the attached drawings, and described in the following specification, are simply exemplary embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer. An "application" or "application program interface" (API) may refer to computer code or other data sorted on a computer-readable medium that may be executed by a processor to facilitate the interaction between software components, such as a client-side front-end and/or server-side back-end for receiving data from the client. An "interface" may refer to a generated display, such as one or more graphical user interfaces (GUIs) with which a user may interact, either directly or indirectly (e.g., through a keyboard, mouse, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction.

As used herein, the term "payment device" may refer to an electronic payment device, a portable financial device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, an electronic payment processing network may refer to the communications between one or more entities for processing the transfer of monetary funds to one or more transactions. The electronic payment processing network may include a merchant system, an acquirer system, a transaction service provider, and an issuer system.

The systems, methods, and computer program products described herein provide numerous technical advantages in classification-based systems that rely on temporal data. In some non-limiting embodiments or aspects, the described solution provides a time-augmented dynamic graph-based generalized model to alleviate the over-smoothing issue on dynamic graph neural network models. To that end, the described solution provides a time-augmented adjacency matrix. The described solution may include a generalized classification model (e.g., PageRank) that is based on the learnable transformation of the proposed time-augmented adjacency matrix, which may allow otherwise static-graph models to be extended to dynamic graphs. The described solution improves model performance (e.g., prediction accuracy) and alleviates the problem of over-smoothing. The described solution further helps separate feature encoding and structural propagation. As determined by testing on synthetic and real-world datasets, this disentanglement further improves model performance.

Improved model performance for classification systems, such as fraud detection and mitigation systems, inherently improves computational cost (e.g., reduced bandwidth, reducing processing capacity, reduced number of communications, etc.) of the classification system. This is partly because enhanced prediction accuracy will reduce false negatives and/or false positives, which means communications typically generated for one classification (e.g., a fraud classification, a non-fraud classification) will not be triggered due to misclassification (e.g., allowing transactions for fraud-associated entities when they should be prevented, triggering fraud mitigation for non-fraud associated entities when no such fraud mitigation is required).

Node classification for graph-structured data may be a process for classifying nodes whose labels are unknown. Dynamic graph node classification is technically significant, because models may be improved by capturing both structural and temporal information, particularly on dynamic graphs with long histories that require large receptive fields. Moreover, dynamic graph node classification improves model scalability to reduce computational costs as the size of dynamic graphs increase. Systems and methods described herein provide such benefits through use of a time augmentation process, which captures the temporal evolution of nodes across time (e.g., structurally), creating a time-augmented spatio-temporal graph. Systems and methods described herein also provide such benefits through use of an information propagation process that learns the dynamic representations for each node across time using the constructed time-augmented graph.

A graph may be a type of data structure that represents relationships between entities (e.g., nodes connected by links, also referred to as edges). Node classification for nodes with unknown labels may have particular technical value for modeling real-world systems that exhibit dynamic relationships. For example, static graphs may not be appropriate for all dynamic real-world systems, such as in biological or social science contexts. In such dynamic systems, nodes may join and leave a graph, links may form and disappear, and communities may merge and split over time. By way of further example, a person's social network may constantly change due to career and life events. Therefore, there is a need for a technical solution, as described herein, that can perform node classification on dynamic graphs, such that more complex and evolving characteristics may be captured. The described systems and methods provide a dynamic structural topology that accounts for temporal aspects of the underlying graph, with improved computational efficiency. First, by constructing a time-augmented graph, temporal graph dynamics may be modeled without introducing significant computational demand, since the construction does not require advanced training. In addition, by learning different importance scores for time-augmented neighborhoods for each node, the model capacity may be enhanced without imposing a significant computational overhead.

Referring now to FIG. 1, FIG. 1 is a diagram of an example environment 100 in which devices, systems, and/or methods, described herein, may be implemented. As shown in FIG. 1, environment 100 may include modeling system 102, memory 104, computing device 106, and communication network 108. Modeling system 102, memory 104, and computing device 106 may interconnect (e.g., establish a connection to communicate) via wired connections, wireless connections, or a combination of wired and wireless connections. In some non-limiting embodiments or aspects, environment 100 may further include a natural language processing system, an advertising system, a fraud detection system, a transaction processing system, a merchant system, an acquirer system, an issuer system, and/or a payment device.

Modeling system 102 may include one or more computing devices configured to communicate with memory 104 and/or computing device 106 at least partly over communication network 108 (e.g., directly, indirectly via communication network 108, and/or the like). Modeling system 102 may be configured to receive data to train one or more machine learning models, and use one or more trained machine learning models to generate an output. Predictive models may include machine learning models that accept, as input, graph data (or data derived from graph data) to generate one or more predictions (e.g., categorizations, value predictions, etc.). Modeling system 102 may include or be in communication with memory 104. Modeling system 102 may be associated with, or included in a same system as, a transaction processing system.

Memory 104 may include one or more computing devices configured to communicate with modeling system 102 and/or computing device 106 (e.g., directly, indirectly via communication network 108, and/or the like). Memory 104 may be configured to store data associated with graphs, adjacency matrices, node embeddings, machine learning models, transactions, and/or the like in one or more non-transitory computer-readable storage media. Memory 104 may communicate with and/or be included in modeling system 102.

Computing device 106 may include one or more processors that are configured to communicate with modeling system 102 and/or memory 104 (e.g., directly, indirectly via communication network 108, and/or the like). Computing device 106 may be associated with a user and may include at least one user interface for transmitting data to and receiving data from modeling system 102 and/or memory 104. For example, computing device 106 may show, on a display of computing device 106, one or more outputs of trained machine learning models executed by modeling system 102. By way of further example, one or more inputs for trained sequential machine learning models may be determined or received by modeling system 102 via a user interface of computing device 106.

Communication network 108 may include one or more wired and/or wireless networks over which the systems and devices of environment 100 may communicate. For example, communication network 108 may include a cellular network (e.g., a long-term evolution (LTE®) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Modeling system 102 may perform one or more steps of the method for dynamic node classification in temporal-based machine learning classification models. In some non-limiting embodiments or aspects, modeling system 102 may receive graph data (e.g., a representational encoding) of a discrete time dynamic graph (e.g., a graph with discrete graph snapshots at separate time steps (e.g., hours, days, weeks, etc.), and which has nodes connected by edges in each snapshot, but such that each graph snapshot may not exhibit the same edges between the same nodes in each snapshot; see also Formula 1, infra). The discrete time dynamic graph may include a plurality of graph snapshots, wherein each graph snapshot of the plurality of graph snapshots is associated with an instance of the discrete time dynamic graph at a time step in a first time period (e.g., days, weeks, months, etc.). Each graph snapshot of the plurality of graph snapshots may include a plurality of nodes, a plurality of edges, and a node attribute matrix (e.g., a matrix produced by compositing a feature vector of attributes for each node of the plurality of nodes of a graph snapshot; see also Formula 5, infra).

In some non-limiting embodiments or aspects, modeling system 102 may receive a plurality of node classifications (e.g., categories, labels, types, etc.) associated with some or all nodes in the discrete time dynamic graph, such that each node classification of the plurality of node classifications is associated with a node of the plurality of nodes in each graph snapshot of the plurality of graph snapshots. In this manner, some or all node classifications may act as a training data set. Modeling system 102 may convert (e.g., reconfigure from a first type to a second type) the discrete time dynamic graph to a time-augmented spatio-temporal graph (e.g., a graph that has data to account for changes over time, with respect to both structural and temporal features of the graph) based on the plurality of edges of each graph snapshot of the plurality of graph snapshots.

In some non-limiting embodiments or aspects, modeling system 102 may generate at least one adjacency matrix (see Formulas 8-11, infra) based on a temporal walk (e.g., a temporally valid sequence of edges traversed in non-decreasing order of edge appearance times; see also Formula 7, infra) of the time-augmented spatio-temporal graph. Modeling system 102 may generate at least one adaptive information transition matrix based on the at least one adjacency matrix (see Formulas 13-15, infra). Modeling system 102 may determine a plurality of feature vectors based on the plurality of nodes and the node attribute matrix of each graph snapshot of the plurality of graph snapshots (see Formula 6, infra), wherein each feature vector of the plurality of feature vectors is associated with a node of the discrete time dynamic graph.

In some non-limiting embodiments or aspects, modeling system 102 may generate a plurality of initial node representations (see Formula 12, infra), wherein each initial node representation of the plurality of initial node representations is based on a feature vector of the plurality of feature vectors and a node associated with the feature vector. Modeling system 102 may propagate the plurality of initial node representations across a plurality of information propagation layers using the at least one adaptive information transition matrix to produce a plurality of final node representations based on an output of a final layer of the plurality of information propagation layers (see Formulas 16 and 17, infra). Modeling system 102 may classify at least one node of the discrete time dynamic graph in a time step of a second time period subsequent to the first time period based on the plurality of final node representations.

In some non-limiting embodiments or aspects, while generating the adjacency matrix based on the temporal walk of the time-augmented spatio-temporal graph, modeling system 102 may generate the adjacency matrix based on a bijection between all possible temporal walks of the time-augmented spatio-temporal graph and all possible temporal walks of the discrete time dynamic graph (see Formula 8, infra). In some non-limiting embodiments or aspects, while generating the adjacency matrix based on the temporal walk of the time-augmented spatio-temporal graph, modeling system 102 may restrict the temporal walk such that when traversing from a first node in a first time step to a second node in a second time step, the temporal walk must first visit a same node in the second time step that corresponds to the first node in the first time step (see Formula 9, infra).

In some non-limiting embodiments or aspects, modeling system 102 may generate the at least one adjacency matrix including a structural adjacency matrix and a temporal adjacency matrix (see Formulas 10 and 11, infra). Modeling system 102 may also generate the at least one adaptive information transition matrix including an adaptive structural transition matrix and an adaptive temporal transition matrix.

In some non-limiting embodiments or aspects, while classifying the at least one node of the discrete time dynamic graph, modeling system 102 may convert the plurality of final node representations to a plurality of class logits using a multilayer perceptron decoder, and classify the at least one node based on the plurality of class logits.

In some non-limiting embodiments or aspects, while generating the at least one adaptive information transition matrix based on the at least one adjacency matrix, modeling system 102 may generate the at least one adaptive information transition matrix based on the at least one adjacency matrix using a dynamic attention mechanism, and may determine an attention weight for the dynamic attention mechanism using a nonlinear activation function (see Formula 13, infra).

In some non-limiting embodiments or aspects, while propagating the plurality of initial node representations across the plurality of information propagation layers using the at least one adaptive information transition matrix, modeling system 102 may feed a plurality of intermediate node representations produced from a first information propagation layer of the plurality of information propagation layers as an input into a second information propagation layer of the plurality of information propagation layers.

As described herein, modeling system 102 may classify nodes for a discrete dynamic graph, which may be defined as an ordered sequence of graph snapshots:

$$\mathbb{G} = \{\mathcal{G}^1, \mathcal{G}^2, \ldots, \mathcal{G}^T\}, \quad \text{Formula 1}$$

where each G represents an undirected graph at time step t in the set of $\{1, 2, \ldots T\}$, and where T is the number of time steps. Each undirected graph G may be represented as:

$$\mathcal{G}^t = (\mathcal{V}, \varepsilon^t, \mathcal{X}^t), \quad \text{Formula 2}$$

where $\mathcal{V}$ is the set of all nodes appearing in $\mathbb{G}$, in which $|\mathcal{V}| = N$ and N is the number of all nodes, $\varepsilon^t$ is the edge set of the snapshot at time t, and $\mathcal{X}^t$ is the node attribute matrix at time step t. The number of nodes $|\mathcal{V}^t|$ with at least one neighbor in each snapshot may vary over time.

Modeling system 102 may represent the edge set $\varepsilon^t$ as:

$$\varepsilon^t \subseteq \mathcal{V}^t \times \mathcal{V}^t, \quad \text{Formula 3}$$

or as an adjacency matrix as follows:

$$A^t \in \mathbb{R}^{N \times N}, \quad \text{Formula 4}$$

where $A_{uv}^t = 1$ if $(u, v) \in \varepsilon^t$ (where u and v represent nodes in graph $G^t$), and $A_{uv}^t = 0$, otherwise.

Modeling system 102 may represent the node attribute matrix $\mathcal{X}^t$ as:

$$\mathcal{X}^t \in \mathbb{R}^{N \times d}, \quad \text{Formula 5}$$

where $\mathbb{R}$ is the set of feature vectors having dimensions of number of nodes N and initial node feature dimension d, in which:

$$x v^t \in \mathbb{R}^d \quad \text{Formula 6}$$

denotes the feature vector of node v at time step t. For annotation, modeling system 102 may use the variable $\mathcal{Y}^t$ to denote the class label associated with each node at time step t, in which case $y_v^t$ may be used to denote the class label of node v. All nodes may have dynamic labels that evolve over time. In view of the above, modeling system 102 may receive a dynamic graph history $\mathbb{G}_L = \{\mathcal{G}^1, \mathcal{G}^2, \ldots, \mathcal{G}^t\}$ and the corresponding node labels $\mathbb{Y}_L = \{\mathcal{Y}^1, \mathcal{Y}^2, \ldots, \mathcal{Y}^t\}$ up to time step t, and generate classifications for all the nodes in future time steps (e.g., snapshots) $\mathbb{G}_U = \{\mathcal{G}^{t+1}, \mathcal{G}^{t+2}, \ldots, \mathcal{G}^T\}$ whose node labels $\mathbb{Y}_U = \{\mathcal{Y}^{t+1}, \mathcal{Y}^{t+2}, \ldots, \mathcal{Y}^T\}$ are unknown.

To generate classifications for nodes in future time steps, modeling system 102 may first perform (e.g., execute program instructions to carry out one or more steps of) a time augmentation process. The time-augmentation process may construct the time augmented graph from input graph snapshots, and the time-augmentation process may include a temporal walk in a discrete dynamic graph setting. A temporal walk of a dynamic graph may be defined as a temporally valid sequence of edges traversed in non-decreasing order of edge appearance times. Modeling system 102 may define a temporal walk from node $v_1$ to node $v_{k+1}$ as $((v_1, v_2, t_1), (v_2, v_3, t_2), \ldots, (v_k, v_{k+1}, t_k))$, such that:

$$(v_k, v_{k+1}) \in \varepsilon^{t_k}, \quad \text{Formula 7}$$

where $t_1 \leq t_2 \leq \ldots \leq t_k$. With this representation, modeling system 102 may construct a time-augmented spatio-temporal graph, the walks of which may be considered as temporal walks simulated on the original dynamic graph.

Modeling system 102 may construct a time-augmented graph in a full time-augmentation realization. For a full time-augmentation realization, modeling system 102 may produce a bijection between all possible walks of the time-augmented graph. The adjacency matrix of the constructed time-augmented graph may be denoted as $A \in \mathbb{R}^{TN \times TN}$, or further represented as:

$$A = \begin{bmatrix} \tilde{A}^1 & A^2 & A^3 & \ldots \\ 0 & \tilde{A}^2 & A^3 & \ldots \\ 0 & 0 & \tilde{A}^3 & \ldots \\ \vdots & \vdots & \vdots & \ddots \\ 0 & 0 & 0 & \tilde{A}^T \end{bmatrix}, \quad \text{Formula 8}$$

where $\tilde{A}^t \in \mathbb{R}^{N \times N}$ is the corresponding adjacency matrix at time step t with self-loops added.

Modeling system 102 may construct a time-augmented graph in a self-evolution time-augmented realization. For a self-evolution time-augmented realization, modeling system 102 may restrict cross-time walks such that only temporally adjacent nodes can be attended by their historical versions. In this realization, node v at time t and time t+1 may be denoted as $v^t$ and $v^{t+1}$, such that modeling system 102 only constructs edges $(v^t, v^{t+1})$. By doing so, all temporal walks may be realized by performing a random walk on the time-augmented graph, since the walk will visit a node's neighbor at different time steps by visiting the node itself at different time steps first. In this realization, the notation for the adjacency matrix of the time-augmented graph may be represented as follows:

$$A = \begin{bmatrix} \tilde{A}^1 & I & 0 & \cdots \\ 0 & \tilde{A}^2 & I & \cdots \\ 0 & 0 & \tilde{A}^3 & \cdots \\ \vdots & \vdots & \vdots & \ddots \\ 0 & 0 & 0 & \tilde{A}^T \end{bmatrix}, \quad \text{Formula 9}$$

where $I \in \mathbb{R}^{N \times N}$ is the identity matrix. In this realization of the time-augmented graph, modeling system 102 reduces computational overhead and simplifies model space complexity.

Modeling system 102 may construct a time-augmented graph in a disentangled time-augmentation realization. For a disentangled time-augmentation realization, modeling system 102 may decouple the self-evolution time-augmentation realization. Instead of considering one time-augmented graph A, modeling system 102 may decouple the graph into a structural adjacency matrix $A_s \in \mathbb{R}^{TN \times TN}$ and a temporal adjacency matrix $A_t \in \mathbb{R}^{TN \times TN}$. $A_s$ and $A_t$ may be represented as:

$$A_s = \begin{bmatrix} \tilde{A}^1 & 0 & 0 & \cdots \\ 0 & \tilde{A}^2 & 0 & \cdots \\ 0 & 0 & \tilde{A}^3 & \cdots \\ \vdots & \vdots & \vdots & \ddots \\ 0 & 0 & 0 & \tilde{A}^T \end{bmatrix} \quad \text{Formula 10}$$

$$A_t = \begin{bmatrix} I & I & 0 & \cdots \\ 0 & I & I & \cdots \\ 0 & 0 & I & \cdots \\ \vdots & \vdots & \vdots & \ddots \\ 0 & 0 & 0 & I \end{bmatrix}. \quad \text{Formula 11}$$

Modeling system 102 may use the time-augmented graph from any of the above-described realizations of a time-augmentation process as input to an information propagation process. The information propagation process learns the adaptive graph transition matrix and employs multiple stacked information propagation layers for capturing both structural and temporal relationships of the time-augmented graph. Modeling system 102 may determine initial node representations of the time-augmented graph as follows:

$$\{x\upsilon^t \in \mathbb{R}^d, \forall \upsilon^t \in \mathcal{V}_{ta}\}, \quad \text{Formula 12}$$

where $\mathcal{V}_{ta}$ denotes the node set of the time-augmented graph, $\varepsilon_{ta}$ denotes the edge set of the time-augmented graph, $|\mathcal{V}_{ta}|=N*T$, $\forall$ is the universal quantification operator, and $x_v$ is the node feature vector of node v. For convenience of annotation, the superscript on the feature vector and node notation may be dropped.

In the information propagation process, modeling system 102 may first perform an adaptive transition process. In the adaptive transition process, modeling system 102 may employ a dynamic attention mechanism to compute the adaptive information transition matrix, which allows the importance of nodes to be learned. Formally, the adaptive graph transition matrix $\hat{A} \in \mathbb{R}^{TN \times TN}$ may be computed as:

$$e_{uv} = a^T \sigma_{att}(A_{uv} \cdot ([\Theta_L, \Theta_R][x_u \mid \mid x_v])), \quad \text{Formula 13}$$

$$\alpha_{uv} = \frac{\exp(e_{uv})}{\sum_{u \in \mathcal{N}_v} \exp(e_{uv})}, \quad \text{Formula 14}$$

$$\hat{A}_{uv}^T = \alpha_{uv}, \quad \text{Formula 15}$$

where $\Theta_L \in \mathbb{R}^{F \times d}$ and $\Theta_R \in \mathbb{R}^{F \times d}$ are the adaptive weight matrices applied on initial node features, [•,•] is the horizontal concatenation of two matrices, [•||•] is the vector concatenation operator, $a \in \mathbb{R}^F$ is the weight vector for attention calculation, $\mathcal{N} = \{u \in v_{ta}: (u, v) \in \varepsilon_{ta}\}$ is the immediate neighbor set of node v on the time-augmented graph, $\sigma_{att}(\bullet)$ is the nonlinear activation function, $\alpha_{uv}$ is the attention weight of link (u, v). The normalized weight coefficient $\alpha_{uv}$ is asymmetric because of the concatenate order and the different neighbor sets of node u and v, and $\hat{A}$ is properly transposed such that the model is autoregressive. For the nonlinear activation function $\sigma_{att}(\bullet)$, the Leaky Rectified Linear Unit (LeakyReLU) function may be used for attention weight calculation (see Formula 13). For the disentangled time-augmentation realization, the adaptive structural transition matrix $\hat{A}_s \in \mathbb{R}^{TN \times TN}$ and adaptive temporal transition matrix $\hat{A}_t \in \mathbb{R}^{TN \times TN}$ may be computed separately following the exact same procedures but with different parameters. The above-described dynamic attention mechanism provides technical improvements over known techniques, partly by not imposing quadratic computational complexity with respect to the number of snapshots, since the attention scores computed structurally for time-augmented neighborhoods.

Modeling system 102 may use deep architectures to capture long range temporal and structural dependencies on the time-augmented graph. The described systems and methods provide improvements over known techniques (e.g., graph convolutional networks, graph attention networks) by preventing performance degradation as the number of layers increase (e.g., preventing over-smoothing). To provide such improvements, modeling system 102 may use a message passing mechanism that makes use of initial residual and identity mapping techniques. Formally, the number of stacked information propagation layers may be denoted as L and the node representation output from the $l^{th}$ layer for the time-augmented graph may be denoted as:

$$\{h_\upsilon^l \in \mathbb{R}_r, \forall \upsilon_\in \mathcal{V}\} \quad \text{Formula 16}$$

where F is the node representation dimension. When I=1 (the first layer), $h_v^0 = \Theta_R x_v$. Compactly, this may be denoted as $H^l \in \mathbb{R}^{TN \times F}$. As such, modeling system 102 may define the message passing mechanism as:

$$H^{l+1} = \sigma_{ip}(((1-\alpha_l)\hat{A}H^l + \alpha_l H^0)$$

$$((1-\beta_l)I + \beta_l W^l)), \quad \text{Formula 17}$$

where $W^l \in \mathbb{R}^{F \times F}$ is the weight matrix, $I \in \mathbb{R}^{F \times F}$ is the identity matrix, $\sigma_{ip}$ is the Rectified Linear Unit (ReLU) activation function, $\alpha_l$ and $\beta_l$ are two hyperparameters. For the disentangled time-augmentation realization, modeling system 102 may compute node representations H by first utilizing the adaptive structural transition matrix $\hat{A}_s$ to capture structural properties and then using the adaptive temporal transition matrix $\hat{A}_t$ to learn temporal dynamics, with different weight matrices $W_s^l$ and $W_t^l$.

Modeling system 102 may feed the output of the information propagation process HL into a multilayer perceptron (MLP) decoder, which converts node representations to class logits, and are optimized to classify nodes in $\mathbb{G}_L$ correctly. Modeling system 102 may use weighted cross-entropy loss as the dynamic node classification objective.

In some non-limiting embodiments or aspects, modeling system 102 may use an adaptive moment estimation (Adam) optimizer and set a learning rate (e.g., 0.01) and a weight decay (e.g., 0.0005) for model training. Modeling system 102 may train each model for a number of epochs (e.g., 200), with a learning rate decay on a plateau scheduler based on validation set macro-area under the curve (AUC) performance. Modeling system 102 may also set a value for the feature dimension of the node representations (e.g., 128). Modeling system 102 may share the same MLP decoder architecture with a set dropout ratio (e.g., 0.3) to convert dynamic node representations to class logits. Modeling system 102 may also tune the number of information propagation layers (e.g., 2, 4, 8, 16, 32, etc.), the dropout ratio (e.g., 0.01, 0.03, 0.05, etc.), attention head number (e.g., 4, 8, 15, 32, 64, etc.), setting to skip connections between nodes (e.g., between true and false), hyperparameter $\lambda = 1 \cdot \beta_l$ (e.g., 0.5, 1.0, 1.5), and hyperparameter $\alpha_l$ (e.g., 0.1, 0.3, 0.5, etc.).

Figure 2:
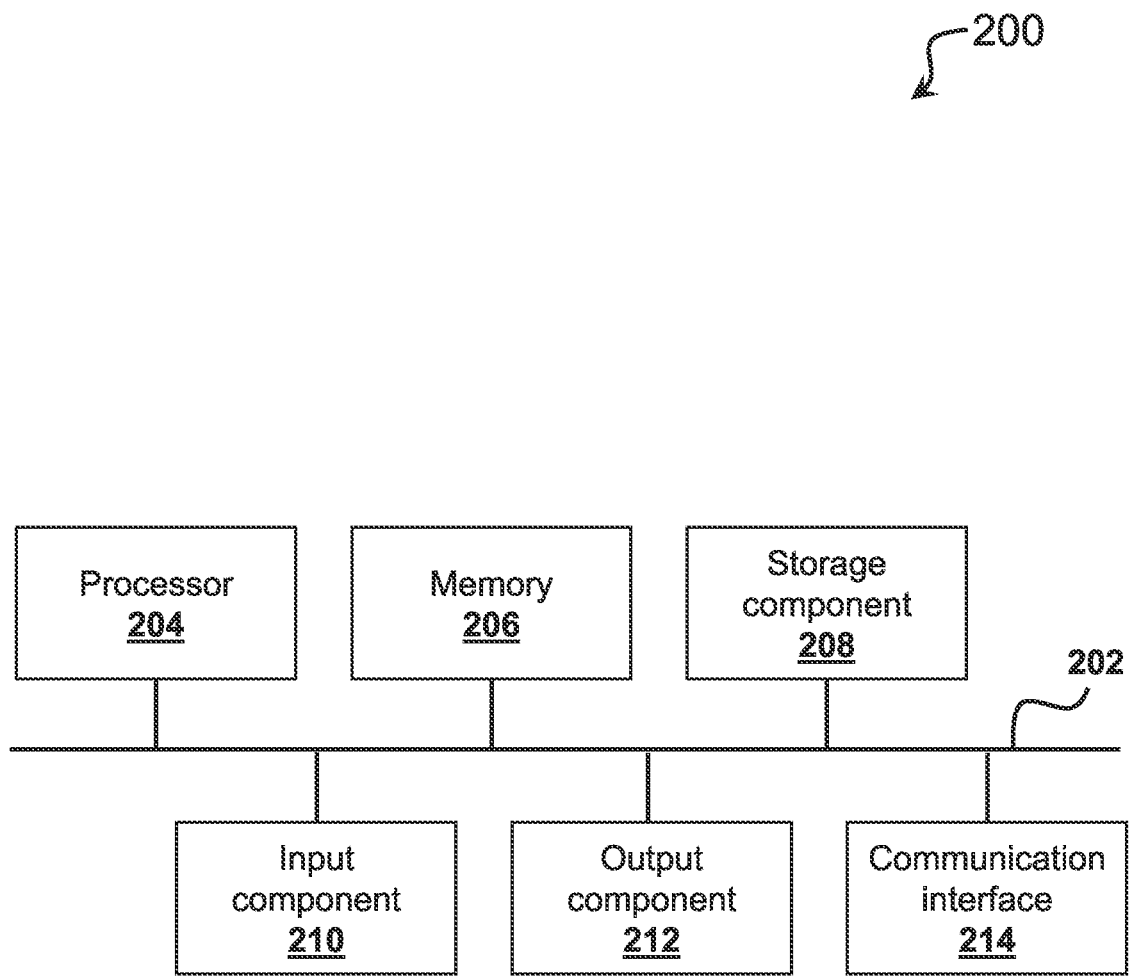
FIG. 2 is a diagram of one or more components, devices, and/or systems, according to non-limiting embodiments or aspects.

Referring now to FIG. 2, FIG. 2 is a diagram of example components of a device 200, according to some non-limiting embodiments or aspects. Device 200 may correspond to one or more devices of modeling system 102, memory 104, computing device 106, and/or communication network 108, as shown in FIG. 1. In some non-limiting embodiments or aspects, such systems or devices may include at least one device 200 and/or at least one component of device 200.

As shown in FIG. 2, device 200 may include bus 202, processor 204, memory 206, storage component 208, input component 210, output component 212, and communication interface 214. Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.) and/or another type of computer-readable medium.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
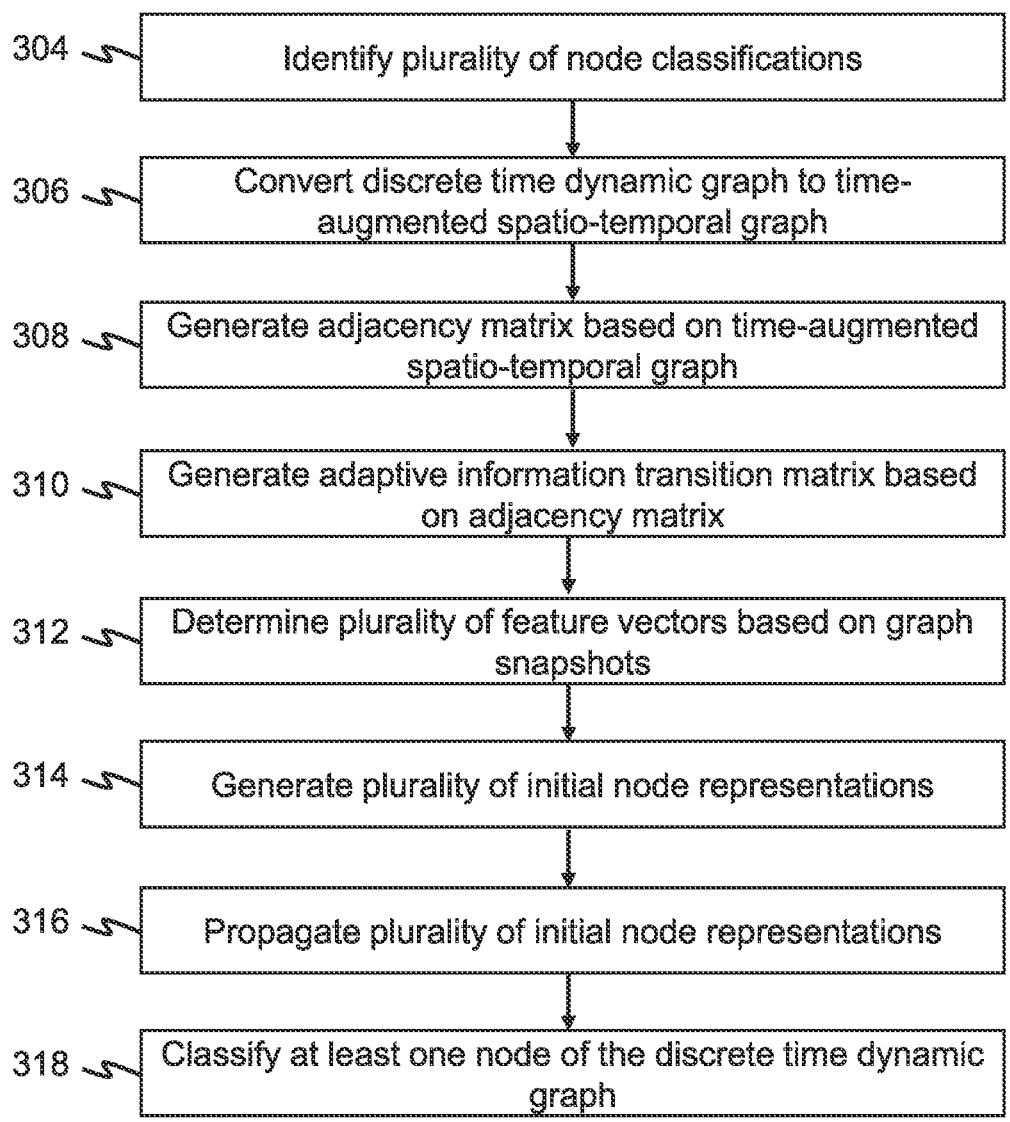
FIG. 3 is a flow diagram of a method for dynamic node classification in temporal-based machine learning classification models, according to non-limiting embodiments or aspects.

Referring now to FIG. 3, a flow diagram of a process 300 for dynamic node classification in temporal-based machine learning classification models is shown, according to some non-limiting embodiments or aspects. The steps shown in FIG. 3 are for example purposes only. It will be appreciated that additional, fewer, different, and/or a different order of steps may be used in non-limiting embodiments or aspects. Each step of process 300 may include a series of processes or steps therein. In some non-limiting embodiments or aspects, one or more of the steps of process 300 may be performed (e.g., completely, partially, and/or the like) by modeling system 102. In some non-limiting embodiments or aspects, one or more of the steps of process 300 may be performed (e.g., completely, partially, and/or the like) by another system, another device, another group of systems, or another group of devices, separate from or including modeling system 300.

As shown in FIG. 3, at step 302, process 300 may include receiving graph data of a discrete time dynamic graph. For example, modeling system 102 may receive graph data of a discrete time dynamic graph including a plurality of graph snapshots. Each graph snapshot of the plurality of graph snapshots may be associated with an instance of the discrete time dynamic graph at a time step in a first time period, and each graph snapshot of the plurality of graph snapshots may include a plurality of nodes, a plurality of edges, and a node attribute matrix.

As shown in FIG. 3, at step 304, process 300 may include receiving a plurality of node classifications. For example, modeling system 102 may receive a plurality of node classifications associated with all nodes in the discrete time dynamic graph. Plurality of node classifications may be included in the graph data received in step 302. Each node classification of the plurality of node classifications may be associated with a node of the plurality of nodes in each graph snapshot of the plurality of graph snapshots.

As shown in FIG. 3, at step 306, process 300 may include converting the discrete time dynamic graph to a time-augmented spatio-temporal graph. For example, modeling system 102 may convert the discrete time dynamic graph to a time-augmented spatio-temporal graph based on the plurality of edges of each graph snapshot of the plurality of graph snapshots.

As shown in FIG. 3, at step 308, process 300 may include generating an adjacency matrix based on the time-augmented spatio-temporal graph. For example, modeling system 102 may generate at least one adjacency matrix based on a temporal walk of the time-augmented spatio-temporal graph. In some non-limiting embodiments or aspects, while generating the adjacency matrix based on the temporal walk of the time-augmented spatio-temporal graph, modeling system 102 may generate the adjacency matrix based on a bijection between all possible temporal walks of the time-augmented spatio-temporal graph and all possible temporal walks of the discrete time dynamic graph. In some non-limiting embodiments or aspects, while generating the adjacency matrix based on the temporal walk of the time-augmented spatio-temporal graph, modeling system 102 may restrict the temporal walk such that when traversing from a first node in a first time step to a second node in a second time step, the temporal walk must first visit a same node in the second time step that corresponds to the first node in the first time step.

As shown in FIG. 3, at step 310, process 300 may include generating an adaptive information transition matrix based on the adjacency matrix. For example, modeling system 102 may generate at least one adaptive information transition matrix based on the at least one adjacency matrix. In some non-limiting embodiments or aspects, the at least one adjacency matrix may include a structural adjacency matrix and a temporal adjacency matrix, and the at least one adaptive information transition matrix may include an adaptive structural transition matrix and an adaptive temporal transition matrix. In some non-limiting embodiments or aspects, while generating the at least one adaptive information transition matrix based on the at least one adjacency matrix, modeling system 102 may generate the at least one adaptive information transition matrix based on the at least one adjacency matrix using a dynamic attention mechanism, and determine an attention weight for the dynamic attention mechanism using a nonlinear activation function.

As shown in FIG. 3, at step 312, process 300 may include determining a plurality of feature vectors based on the graph snapshots. For example, modeling system 102 may determine a plurality of feature vectors based on the plurality of nodes and the node attribute matrix of each graph snapshot of the plurality of graph snapshots. Each feature vector of the plurality of feature vectors may be associated with a node of the discrete time dynamic graph.

As shown in FIG. 3, at step 314, process 300 may include generating a plurality of initial node representations. For example, modeling system 102 may generate a plurality of initial node representations, wherein each initial node representation of the plurality of initial node representations is based on a feature vector of the plurality of feature vectors and a node associated with the feature vector.

As shown in FIG. 3, at step 316, process 300 may include propagating the plurality of initial node representations. For example, modeling system 102 may propagate the plurality of initial node representations across a plurality of information propagation layers using the at least one adaptive information transition matrix to produce a plurality of final node representations based on an output of a final layer of the plurality of information propagation layers. In some non-limiting embodiments or aspects, while propagating the plurality of initial node representations across the plurality of information propagation layers using the at least one adaptive information transition matrix, modeling system 102 may feed (e.g., pass an output from one sequence of steps as an input to another sequence of steps) a plurality of intermediate node representations produced from a first information propagation layer of the plurality of information propagation layers as an input into a second information propagation layer of the plurality of information propagation layers.

As shown in FIG. 3, at step 318, process 300 may include classifying at least one node of the discrete time dynamic graph. For example, modeling system 102 may classify at least one node of the discrete time dynamic graph in a time step of a second time period subsequent to the first time period based on the plurality of final node representations. The classification may be a prediction derived from the plurality of node classifications received in step 304 (e.g., as training data), via steps 306, 308, 310, 312, 314, and 316. In some non-limiting embodiments or aspects, while classifying the at least one node of the discrete time dynamic graph, modeling system 102 may convert the plurality of final node representations to a plurality of class logits using a multi-layer perceptron decoder and classify the at least one node based on the plurality of class logits.

Figure 4:
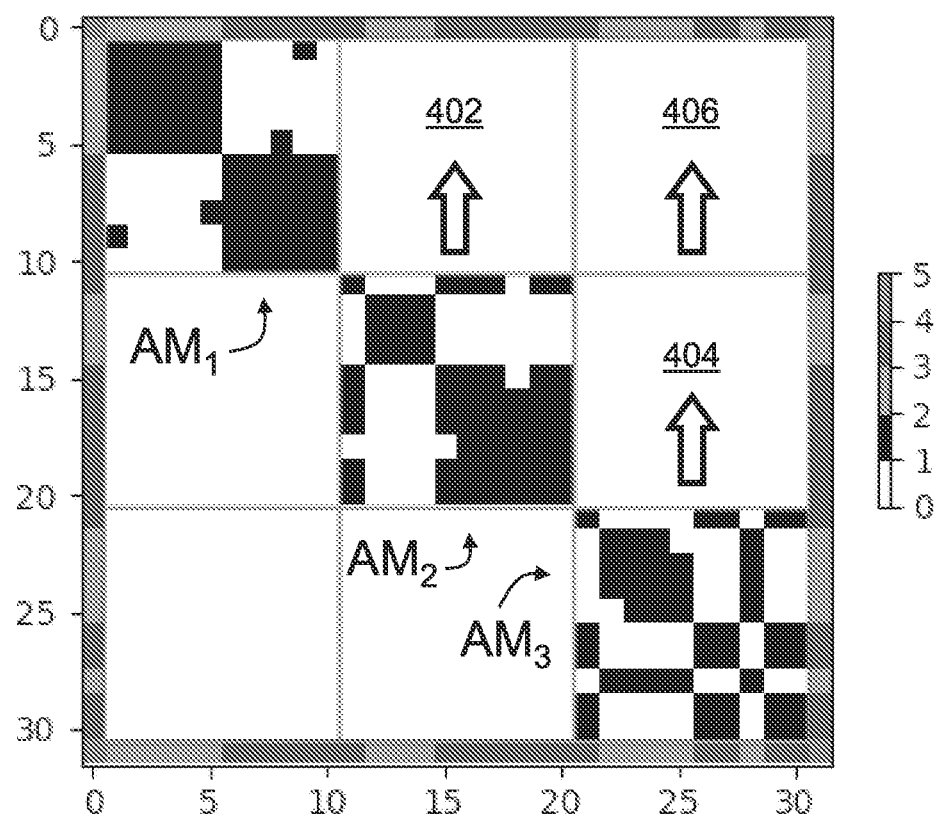
FIG. 4 is a visualization of a process for generating an adjacency matrix based on a time-augmented spatio-temporal graph for use in a method for dynamic node classification in temporal-based machine learning classification models, according to non-limiting embodiments or aspects.

Referring now to FIG. 4, a visualization of a process for generating an adjacency matrix based on a time-augmented spatio-temporal graph is shown for use in a method for dynamic node classification in temporal-based learning classification models, according to some non-limiting embodiments or aspects. In particular, FIG. 4 depicts a process based on a full time-augmented realization (see Formula 8, supra). Initially, a first adjacency matrix $AM_1$ of the graph snapshot for time step $T_1$ is placed at a first position in the upper leftmost quadrant. The x-axis and the y-axis represent node index values. Black squares represent a value of 1 in an adjacency matrix, in which a node (at index value x) is connected to another node (at index value y). Each node is deemed to be connected to itself in the original adjacency matrix (e.g., a self-loop, such that there is a value of 1 (black square) along the entire diagonal)). The process is repeated by inserting adjacency matrices for each graph snapshot for each time step of the discrete time dynamic graph. For example, a second adjacency matrix $AM_2$ of the graph snapshot for time step $T_2$ is placed at a second position in the middle quadrant, and a third adjacency matrix $AM_3$ of the graph snapshot for time step $T_3$ is placed at a third position in the lower rightmost quadrant. It will be appreciated that, by the nature of a discrete time dynamic graph, the adjacency matrices of the graph snapshots at time steps $T_1$, $T_2$, and $T_3$ may differ. It will also be appreciated that the illustration of FIG. 4 may be expanded for additional time steps, such that subsequent adjacency matrices for graph snapshots at time steps $T_4$ to $T_N$ may be continued along the diagonal. The process depicted in FIG. 4 is continued as depicted in FIG. 5, in which the adjacency matrix $AM_2$ is copied upward into position 402, and in which the adjacency matrix AM3 is copied upward into position 404 and position 406.

Figure 5:
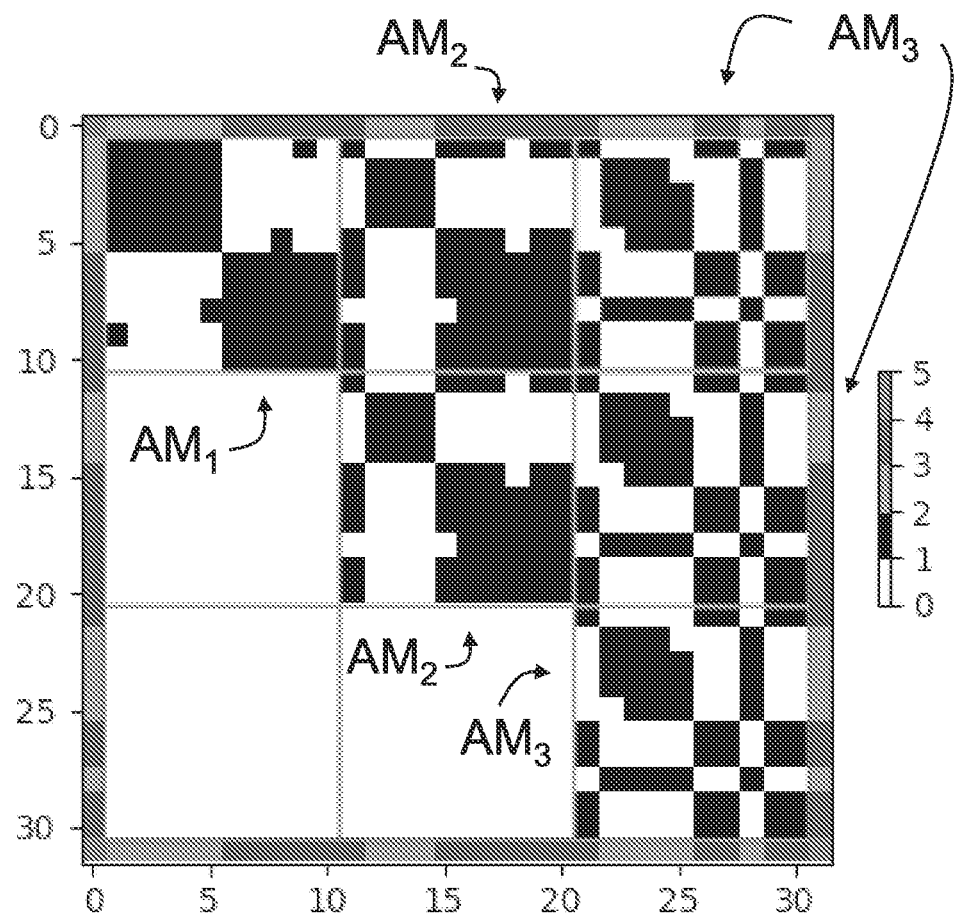
FIG. 5 is a visualization of a process for generating an adjacency matrix based on a time-augmented spatio-temporal graph for use in a method for dynamic node classification in temporal-based machine learning classification models, according to non-limiting embodiments or aspects.

Referring now to FIG. 5, a visualization of a process for generating an adjacency matrix based on a time-augmented spatio-temporal graph is shown for use in a method for dynamic node classification in temporal-based learning classification models, according to some non-limiting embodiments or aspects. In particular, FIG. 5 continues the process of FIG. 4 based on a full time-augmented realization (see Formula 8, supra). As shown, the adjacency matrix $AM_2$ has been copied upward and now appears twice in the second column of adjacency matrices (corresponding to time step $T_2$). Moreover, adjacency matrix $AM_3$ has been copied upward and now appears three times in the third column of adjacency matrices (corresponding to time step $T_3$). It will be appreciated that the illustration of FIG. 5 may be expanded for additional time steps, such that at time step $T_N$, adjacency matrix $AM_N$ appears N times in the $N^{th}$ column. The process depicted in FIG. 5 is continued as depicted in FIGS. 6 and 7, in which the self-loop (e.g., value of 1 along the diagonal) for differences in time steps greater than 1 (e.g., where an adjacency matrix is copied upward a second or subsequent time) is removed from the copied adjacency matrices.

Figure 6:
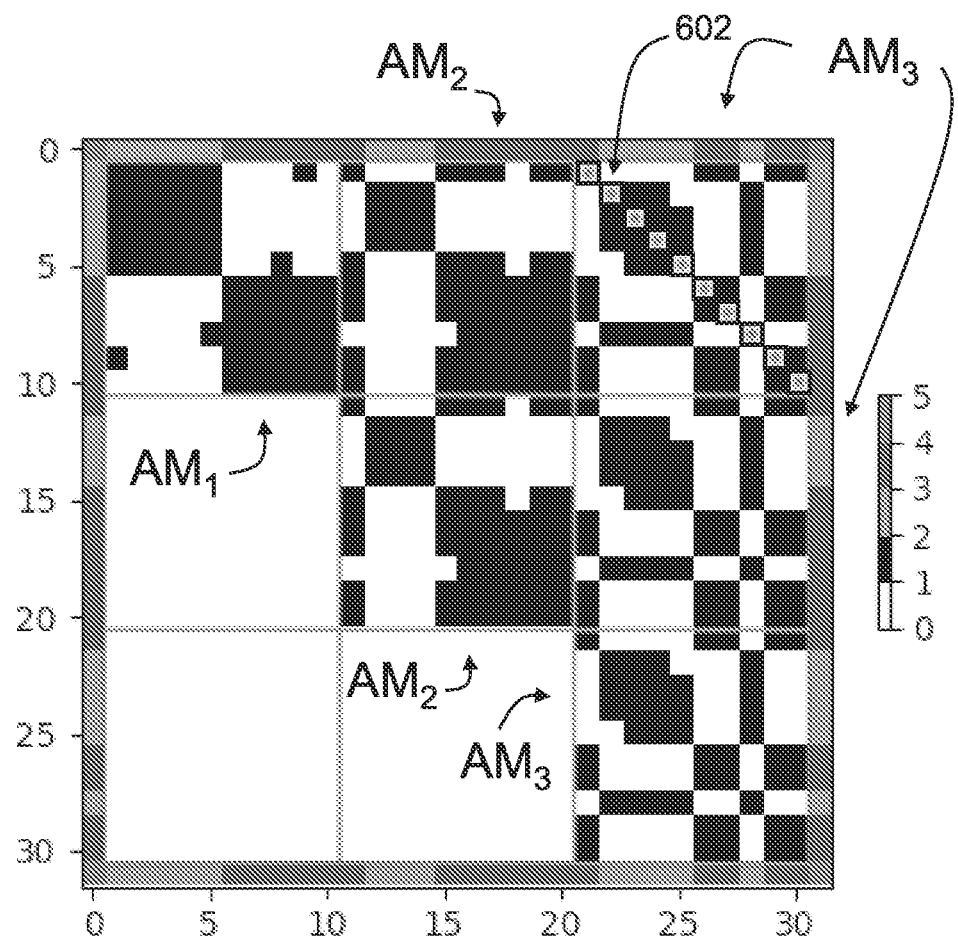
FIG. 6 is a visualization of a process for generating an adjacency matrix based on a time-augmented spatio-temporal graph for use in a method for dynamic node classification in temporal-based machine learning classification models, according to non-limiting embodiments or aspects.
Figure 7:
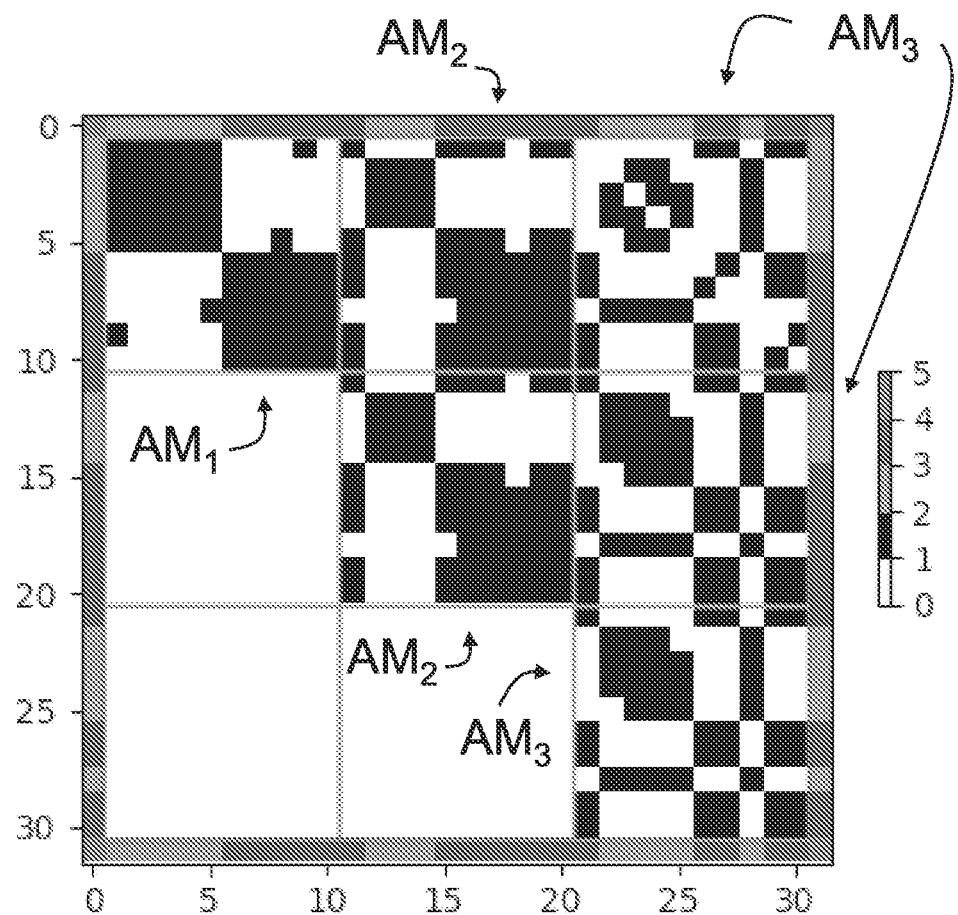
FIG. 7 is a visualization of a process for generating an adjacency matrix based on a time-augmented spatio-temporal graph for use in a method for dynamic node classification in temporal-based machine learning classification models, according to non-limiting embodiments or aspects.

Referring now to FIGS. 6 and 7, visualizations of a process for generating an adjacency matrix based on a time-augmented spatio-temporal graph are shown for use in a method for dynamic node classification in temporal-based learning classification models, according to some non-limiting embodiments or aspects. In particular, FIGS. 6 and 7 continue the process of FIG. 5 based on a full time-augmented realization (see Formula 8, supra). For differences in time steps greater than 1, the self-loop is removed from the respective copied adjacency matrix. For example, an example self-loop 602 is depicted in FIG. 6, appearing in the second copy of adjacency matrix $AM_3$. Example self-loop 602, shown in FIG. 6, is removed from the second copy of adjacency matrix $AM_3$ in FIG. 7. In this manner, temporal dynamic graph information may be converted to structural information.

Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the appended claims. For example, it is to be understood that the present invention contemplates that, to the extent possible, one or more features of any embodiment or aspect can be combined with one or more features of any other embodiment or aspect, and one or more steps may be taken in a different order than presented in the present invention.

What is claimed is:

1. A computer-implemented method comprising:
   receiving, with at least one processor, graph data of a discrete time dynamic graph comprising a plurality of graph snapshots, wherein each graph snapshot of the plurality of graph snapshots is associated with an instance of the discrete time dynamic graph at a time step in a first time period, and wherein each graph snapshot of the plurality of graph snapshots comprises a plurality of nodes, a plurality of edges, and a node attribute matrix;
   receiving, with the at least one processor, a plurality of node classifications associated with all nodes in the discrete time dynamic graph, wherein each node classification of the plurality of node classifications is associated with a node of the plurality of nodes in each graph snapshot of the plurality of graph snapshots;
   converting, with the at least one processor, the discrete time dynamic graph to a time-augmented spatio-temporal graph based on the plurality of edges of each graph snapshot of the plurality of graph snapshots;
   generating, with the at least one processor, an adjacency matrix of at least one adjacency matrix based on a temporal walk of the time-augmented spatio-temporal graph, the adjacency matrix comprising a plurality of adjacency matrices positioned along a diagonal of the adjacency matrix, wherein each adjacency matrix of the plurality of adjacency matrices is associated with a graph snapshot of the plurality of graph snapshots at a separate time step in the first time period, and wherein the adjacency matrix of the at least one adjacency matrix comprises at least one copied matrix of one or more adjacency matrices of the plurality of adjacency matrices;
   generating, with the at least one processor, at least one adaptive information transition matrix based on the at least one adjacency matrix;
   determining, with the at least one processor, a plurality of feature vectors based on the plurality of nodes and the node attribute matrix of each graph snapshot of the plurality of graph snapshots, wherein each feature vector of the plurality of feature vectors is associated with a node of the discrete time dynamic graph;
   generating, with the at least one processor, a plurality of initial node representations, wherein each initial node representation of the plurality of initial node representations is based on a feature vector of the plurality of feature vectors and a node associated with the feature vector;
   propagating, with the at least one processor, the plurality of initial node representations across a plurality of information propagation layers using the at least one adaptive information transition matrix to produce a plurality of final node representations based on an output of a final layer of the plurality of information propagation layers; and
   classifying, with the at least one processor, at least one node of the discrete time dynamic graph in a time step of a second time period subsequent to the first time period based on the plurality of final node representations.

2. The method of claim 1, wherein generating the adjacency matrix of the at least one adjacency matrix based on the temporal walk of the time-augmented spatio-temporal graph comprises:
   generating, with the at least one processor, the adjacency matrix of the at least one adjacency matrix based on a bijection between all possible temporal walks of the time-augmented spatio-temporal graph and all possible temporal walks of the discrete time dynamic graph.

3. The method of claim 1, wherein generating the adjacency matrix of the at least one adjacency matrix based on the temporal walk of the time-augmented spatio-temporal graph comprises:

restricting, with the at least one processor, the temporal walk such that when traversing from a first node in a first time step to a second node in a second time step, the temporal walk must first visit a same node in the second time step that corresponds to the first node in the first time step.

4. The method of claim 1, wherein the at least one adjacency matrix comprises a structural adjacency matrix and a temporal adjacency matrix.

5. The method of claim 1, wherein the at least one adaptive information transition matrix comprises an adaptive structural transition matrix and an adaptive temporal transition matrix.

6. The method of claim 1, wherein classifying the at least one node of the discrete time dynamic graph comprises:
converting, with the at least one processor, the plurality of final node representations to a plurality of class logits using a multilayer perceptron decoder; and
classifying, with the at least one processor, the at least one node based on the plurality of class logits.

7. The method of claim 1, wherein generating the at least one adaptive information transition matrix based on the at least one adjacency matrix comprises:
generating, with the at least one processor, the at least one adaptive information transition matrix based on the at least one adjacency matrix using a dynamic attention mechanism; and
determining, with the at least one processor, an attention weight for the dynamic attention mechanism using a nonlinear activation function.

8. The method of claim 1, wherein propagating the plurality of initial node representations across the plurality of information propagation layers using the at least one adaptive information transition matrix comprises:
feeding, with the at least one processor, a plurality of intermediate node representations produced from a first information propagation layer of the plurality of information propagation layers as an input into a second information propagation layer of the plurality of information propagation layers.

9. A system comprising at least one processor, the at least one processor being programmed or configured to:
receive graph data of a discrete time dynamic graph comprising a plurality of graph snapshots, wherein each graph snapshot of the plurality of graph snapshots is associated with an instance of the discrete time dynamic graph at a time step in a first time period, and wherein each graph snapshot of the plurality of graph snapshots comprises a plurality of nodes, a plurality of edges, and a node attribute matrix;
receive a plurality of node classifications associated with all nodes in the discrete time dynamic graph, wherein each node classification of the plurality of node classifications is associated with a node of the plurality of nodes in each graph snapshot of the plurality of graph snapshots;
convert the discrete time dynamic graph to a time-augmented spatio-temporal graph based on the plurality of edges of each graph snapshot of the plurality of graph snapshots;
generate an adjacency matrix of at least one adjacency matrix based on a temporal walk of the time-augmented spatio-temporal graph, the adjacency matrix comprising a plurality of adjacency matrices positioned along a diagonal of the adjacency matrix, wherein each adjacency matrix of the plurality of adjacency matrices is associated with a graph snapshot of the plurality of graph snapshots at a separate time step in the first time period, and wherein the adjacency matrix of the at least one adjacency matrix comprises at least one copied matrix of one or more adjacency matrices of the plurality of adjacency matrices;
generate at least one adaptive information transition matrix based on the at least one adjacency matrix;
determine a plurality of feature vectors based on the plurality of nodes and the node attribute matrix of each graph snapshot of the plurality of graph snapshots, wherein each feature vector of the plurality of feature vectors is associated with a node of the discrete time dynamic graph;
generate a plurality of initial node representations, wherein each initial node representation of the plurality of initial node representations is based on a feature vector of the plurality of feature vectors and a node associated with the feature vector;
propagate the plurality of initial node representations across a plurality of information propagation layers using the at least one adaptive information transition matrix, to produce a plurality of final node representations based on an output of a final layer of the plurality of information propagation layers; and
classify at least one node of the discrete time dynamic graph in a time step of a second time period subsequent to the first time period based on the plurality of final node representations.

10. The system of claim 9, wherein, while generating the adjacency matrix of the at least one adjacency matrix based on the temporal walk of the time-augmented spatio-temporal graph, the at least one processor is programmed or configured to:
generate the adjacency matrix of the at least one adjacency matrix based on a bijection between all possible temporal walks of the time-augmented spatio-temporal graph and all possible temporal walks of the discrete time dynamic graph.

11. The system of claim 9, wherein, while generating the adjacency matrix of the at least one adjacency matrix based on the temporal walk of the time-augmented spatio-temporal graph, the at least one processor is programmed or configured to:
restrict the temporal walk such that when traversing from a first node in a first time step to a second node in a second time step, the temporal walk must first visit a same node in the second time step that corresponds to the first node in the first time step.

12. The system of claim 9, wherein the at least one adjacency matrix comprises a structural adjacency matrix and a temporal adjacency matrix.

13. The system of claim 12, wherein the at least one adaptive information transition matrix comprises an adaptive structural transition matrix and an adaptive temporal transition matrix.

14. The system of claim 9, wherein, while classifying the at least one node of the discrete time dynamic graph, the at least one processor is programmed or configured to:
convert the plurality of final node representations to a plurality of class logits using a multilayer perceptron decoder; and
classify the at least one node based on the plurality of class logits.

15. A computer program product comprising at least one non-transitory computer-readable medium comprising one or more instructions that, when executed by at least one processor, cause the at least one processor to:

receive graph data of a discrete time dynamic graph comprising a plurality of graph snapshots, wherein each graph snapshot of the plurality of graph snapshots is associated with an instance of the discrete time dynamic graph at a time step in a first time period, and wherein each graph snapshot of the plurality of graph snapshots comprises a plurality of nodes, a plurality of edges, and a node attribute matrix;

receive a plurality of node classifications associated with all nodes in the discrete time dynamic graph, wherein each node classification of the plurality of node classifications is associated with a node of the plurality of nodes in each graph snapshot of the plurality of graph snapshots;

convert the discrete time dynamic graph to a time-augmented spatio-temporal graph based on the plurality of edges of each graph snapshot of the plurality of graph snapshots;

generate an adjacency matrix of at least one adjacency matrix based on a temporal walk of the time-augmented spatio-temporal graph, the adjacency matrix comprising a plurality of adjacency matrices positioned along a diagonal of the adjacency matrix, wherein each adjacency matrix of the plurality of adjacency matrices is associated with a graph snapshot of the plurality of graph snapshots at a separate time step in the first time period, and wherein the adjacency matrix of the at least one adjacency matrix comprises at least one copied matrix of one or more adjacency matrices of the plurality of adjacency matrices;

generate at least one adaptive information transition matrix based on the at least one adjacency matrix;

determine a plurality of feature vectors based on the plurality of nodes and the node attribute matrix of each graph snapshot of the plurality of graph snapshots, wherein each feature vector of the plurality of feature vectors is associated with a node of the discrete time dynamic graph;

generate a plurality of initial node representations, wherein each initial node representation of the plurality of initial node representations is based on a feature vector of the plurality of feature vectors and a node associated with the feature vector;

propagate the plurality of initial node representations across a plurality of information propagation layers using the at least one adaptive information transition matrix, to produce a plurality of final node representations based on an output of a final layer of the plurality of information propagation layers; and classify at least one node of the discrete time dynamic graph in a time step of a second time period subsequent to the first time period based on the plurality of final node representations.

16. The computer program product of claim 15, wherein the one or more instructions that cause the at least one processor to generate the adjacency matrix of the at least one adjacency matrix based on the temporal walk of the time-augmented spatio-temporal graph cause the at least one processor to:

generate the adjacency matrix of the at least one adjacency matrix based on a bijection between all possible temporal walks of the time-augmented spatio-temporal graph and all possible temporal walks of the discrete time dynamic graph.

17. The computer program product of claim 15, wherein the one or more instructions that cause the at least one processor to generate the adjacency matrix of the at least one adjacency matrix based on the temporal walk of the time-augmented spatio-temporal graph cause the at least one processor to:

restrict the temporal walk such that when traversing from a first node in a first time step to a second node in a second time step, the temporal walk must first visit a same node in the second time step that corresponds to the first node in the first time step.

18. The computer program product of claim 15, wherein the at least one adjacency matrix comprises a structural adjacency matrix and a temporal adjacency matrix.

19. The computer program product of claim 18, wherein the at least one adaptive information transition matrix comprises an adaptive structural transition matrix and an adaptive temporal transition matrix.

20. The computer program product of claim 15, wherein the one or more instructions that cause the at least one processor to classify the at least one node of the discrete time dynamic graph cause the at least one processor to:

convert the plurality of final node representations to a plurality of class logits using a multilayer perceptron decoder; and classify the at least one node based on the plurality of class logits.

* * * * *